United States Patent
Pal et al.

(10) Patent No.: US 10,922,609 B2
(45) Date of Patent: Feb. 16, 2021

(54) SEMI-SUPERVISED LEARNING VIA DEEP LABEL PROPAGATION

(71) Applicant: Facebook, Inc., Menlo Park, CA (US)

(72) Inventors: Aditya Pal, San Jose, CA (US); Deepayan Chakrabarti, Austin, TX (US); Karthik Subbian, Cupertino, CA (US); Anitha Kannan, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 938 days.

(21) Appl. No.: 15/597,290

(22) Filed: May 17, 2017

(65) Prior Publication Data
US 2018/0336457 A1   Nov. 22, 2018

(51) Int. Cl.
*G06N 3/08* (2006.01)
*G06F 16/901* (2019.01)
*G06N 3/04* (2006.01)
*G06N 5/02* (2006.01)
*G06N 20/10* (2019.01)

(52) U.S. Cl.
CPC ........... *G06N 3/08* (2013.01); *G06F 16/9024* (2019.01); *G06N 3/0427* (2013.01); *G06N 3/0454* (2013.01); *G06N 3/0481* (2013.01); *G06N 5/022* (2013.01); *G06N 3/0472* (2013.01); *G06N 20/10* (2019.01)

(58) Field of Classification Search
CPC .. G06F 16/9024; G06N 20/10; G06N 3/0427; G06N 3/0454; G06N 3/0472; G06N 3/0481; G06N 3/08; G06N 5/022
See application file for complete search history.

(56) References Cited

U.S. PATENT DOCUMENTS 9,852,231 B1 * 12/2017 Ravi ................... G06F 16/9024

OTHER PUBLICATIONS

Chen et al., "Relation Extraction Using Label Propagation Based Semi-supervised Learning", 2006, Proceedings of the 21st International Conference on Computational Linguistics and 44th Annual Meeting of the ACL, pp. 129-136 (Year: 2006).*

(Continued)

*Primary Examiner* — Kamran Afshar
*Assistant Examiner* — Brent Johnston Hoover
(74) *Attorney, Agent, or Firm* — Baker Botts L.L.P.

(57) ABSTRACT

In one embodiment, a system may access a graph data structure that includes nodes and connections between the nodes. Each node may be associated with a user; each connection between two nodes may represent a relationship between the associated users; and each node may be either labeled or unlabeled with respect to a label type. For each labeled node, a label of the label type of that labeled node may be propagated to other nodes through the connections. For each node, the system may store a label distribution information associated with the label type based on the propagated labels reaching the node. The system may train a machine-learning model using the labels and the label distribution information of a set of the labeled nodes. A predicted label for each unlabeled node may be generated using the model and the label distribution information of the unlabeled node.

20 Claims, 6 Drawing Sheets

(56) References Cited

OTHER PUBLICATIONS

Lu, et al., "Link-based Classification." Department of Computer Science/UMIACS, University of Maryland, College Park, Maryland. Proceedings of the Twentieth Int'l Conference on Machine Learning (ICML-2003), Washington, D.C. pp. 496-503, 2003.

Belkin, et al., "Manifold Regularization: A Geometric Framework for Learning from Labeled and Unlabeled Examples." Journal of Machine Learning Research 7. pp. 2399-2434, 2006.

Nakai, et al., "Expert System for Predicting Protein Localization Sites in Gram-Negative Bacteria." Institute for Chemical Research, Kyoto University, Japan. PROTEINS: Structure, Function, and Genetics 11. pp. 95-110, 1991.

Ranzato, et al., "Unsupervised Learning of Invariant Feature Hierarchies with Applications to Object Recognition." Courant Institute of Mathematical Sciences, New York University, New York, NY. {ranzato,jhuangfu,ylan,yann}@cs.nyu.edu, http://www.cs.nyu.edu/~yann. IEEE 1-4244-1180-7/07, 2007.

Schmidhuber, et al., "Deep Learning in Neural Networks: An Overview." University of Lugano & SUPSI, Switzerland. Technical Report IDSIA-03-14 / arXiv: 1404.7828v4 [cs.NE]. pp. 1 to 88, Oct. 8, 2014.

Settles, Burr, "Active Learning Literature Survey." Computer Sciences Technical Report 1648, University of Wisconsin-Madison. 67 Pages, Jan. 26, 2010.

Silver, et al., "Mastering the game of Go with deep neural networks and tree search." Nature, vol. 529, pp. 484-503, Jan. 28, 2016.

Sindhwani, et al., "Beyond the Point Cloud: from Transductive to Semi-supervised Learning." Department of Computer Science, University of Chicago, Chicago, IL. Appearing in Procedings of the 22nd International Conference on Machine Learning, Bonn, Germany. 8 Pages, 2005.

Taskar, et al., "Discriminative Probabilistic Models for Relational Data." Computer Science Dept., Stanford University, Stanford, CA. pp. 485-492, 2002.

Ugander, et al., "Balanced Label Propagation for Partitioning Massive Graphs." Center for Applied Mathematics, Cornell University, Ithaca, New York, and Facebook, Menlo Park, CA. WSDM'2013, Rome, Italy. 11 Pages, Feb. 4-8, 2013.

Wang, et al., "Stochastic Blockmodels for Directed Graphs." Journal of the American Statistical Association, vol. 82, No. 397. http://dx.doi.org/10.1080/01621459.1987.10478385. 13 Pages, Mar. 1987.

Weston, et al., "Deep Learning via Semi-Supervised Embedding." Appearing in Proceedings of the 25th International Conference on Machiney Learning, Helsinki, Finland. 8 Pages, 2008.

Xiong, et al., "Achieving Human Parity in Conversational Speech Recognition." Microsoft Research Technical Report MSR-TR-2016-71. arXiv:1610.05256v1 [cs.CL]. 12 Pages, Oct. 17, 2016.

Xiong, et al., "Achieving Human Parity in Conversational Speech Recognition." Microsoft Research Technical Report MSR-TR-2016-71. 13 Pages, Feb. 2017.

Yang, et al., "Revisiting Semi-Supervised Learning with Graph Embeddings." School of Computer Science, Carnegie Mellon University. Proceedings of the 33rd International Conference on Machine Learning, New York, NY. JMLR: W&CP vol. 48. 9 Pages, 2016.

Zhu, et al., "Learning from Labeled and Unlabeled Data with Label Propagation." School of Computer Science, Carnegie Mellon University, Pittsburg, PA. 19 Pages, Jun. 2002.

Zhu, et al., "Semi-Supervised Learning Using Gaussian Fields and Harmonic Functions." School of Computer Science, Mellon University, Pitsburg, PA. Proceedings of the Twentieth International Conference on Machine Learning (ICML-2003), Washington, DC. 8 Pages, 2003.

Cai, et al., "Semi-supervised Discriminant Analysis." IEEE, 978-1-4244-1631-8/07. 7 Pages, 2007.

Chakrabarti, et al., "Joint Inference of Multiple Label Types in Large Networks." Proceedings of the 31st International Conference on Machine Learning Bejing, China. JMLR: W&CP vol. 32. 9 Pages, 2014.

Chakrabarti, et al., "Enhanced hypertext categorization using hyperlinks." http://www.yahoo.com and http//www.ibm.com/patents. SIGMOD, pp. 307-318, 1998.

Chapelle, et al., "Semi-Supervised Classification by Low Density Separation." Abstract, pp. 57-64, Sep. 2005.

He, et al., "Deep Residual Learning for Image Recognition." IEEE Xplore, pp. 770-778, 2015.

Kipf, et al., "Semi-Supervised Classification with Graph Convolutional Networks." Published as a conference paper at ICLR 2017. arXiv:1609.02907v4 [cs.LG]. pp. 1-14, Feb. 22, 2017.

Kobayashi, et al., "Logistic Label Propagation." Pattern Recognition Letters, 33 Elsevier, (2012), pp. 580-588, Dec. 24, 2010.

Koller, et al., "Probabilistic frame-based systems." AAA1-98 Proceedings. 8 pages, 1998.

Kruskal, et al., "Multidimensional Scaling Sage University Papers Series. Quantitative Applications in the Social Sciences." Sage Publication, Inc., No. 07-011, 69 pages, 1978.

Lecun, et al., "Gradient-Based Learning Applied to Document Recognition." Proceedings of the IEEE, vol. 86, No. 11. pp. 2278-2324, Nov. 11, 1998.

Macskassy, et al., "A Simple Relational Classifier." NYU Stern School of Business. pp. 64-76, 2003.

McPherson, et al., "Birds of a Feather: Homophily." Annu. Rev. Sociol., pp. 415-444, 2001.

Airoldi, et al., "Mixed Membership Stochastic Blockmodels." Journal of Machine Learning Research 9, pp. 1981-2014, 2008.

Amini, et al., "Semi-Supervised Logistic Regression." Computer Science Laboratory of Paris, University of Pierre et Marie Curie. In Proceedings of the 15th European Conference on Artificial Intelligence IOS Press. 5 Pages, Jul. 21, 2002.

Baluja, et al., "Video Suggestion and Discovery for YouTube: Taking Random Walks Through the View Graph." WWW/Alternate Track: Industrial Practice and Experience, Beijing, China. pp. 895-904, Apr. 21-25, 2008.

Belkin, et al., "Regularization and Semi-supervised Learning on Large Graphs." Colt, LNAI 3120, pp. 624-638, 2004.

Belkin, et al., "Laplacian Eigenmaps for Dimensionality Reduction and Data Representation." Neural Computation 15, Massachusetts Institute of Technology, pp. 1373-1396, 2003.

Bengio, et al., "Greedy Layer-Wise Training of Deep Networks." Abstract, Universite de Montreal, Montreal, Quebec. 8 Pages, 2006.

Blei, et al., "Latent Dirichlet Allocation." Journal of Machine Learning Research 3, pp. 993-1022, Jan. 2003.

Hinton, et al., "A Fast Learning Algorithm for Deep Belief Nets." Neural Computation 18, pp. 1527-1554. Massachusetts Institute of Technology, 2006.

Krizhevsky, et al., "ImageNet Classification with Deep Convolutional Neural Networks." Abstract, pp. 1-9, 2010.

Lee, et al., "Algorithms for Non-negative Matrix Factorization." Abstract, InAdvances in neural information processing systems, 7 pages, 2001.

Macskassy, et al., "Classification in Networked Data: A Toolkit and a Univariate Case Study." Journal of Machine Learning Research 8, pp. 935-983, 2007.

Melacci, et al., "Laplacian Support Vector Machines Trained in the Primal." Journal of Machine Learning Research 12, pp. 1149-1184, 2011.

Neville, et al., "Relational Dependency Networks." Journal of Machine Learning Research 8, pp. 653-692, 2007.

Pal, et al., "Discovery of Topical Authorities in Instagram." Abstract, International World Wide Web Conference, Montreal, Quebec, Canada. pp. 1203-1213, Apr. 11-15, 2016.

Salakhutdinov, et al., "Probabilistic Matric Facgtorization." Abstract, Department of Computer Science, University of Toronto, Canada. NIPS'07 Proceedings of the 20th International Conference on Neural Information Processing Systems. Vancouver, British Columbia. pp. 1-8, Dec. 3-6, 2007.

Szummer, et al., "Partially labeled classification with Markov random walks." In Advances in neural information processing systems. 8 pages, 2002.

Zhou, et al., "Learning with Local and Global Consistency." Advances in neural information processing systems. Max Planck Institute for Biological Cybernetics, Tuebingen, Germany, 8 pages, 2004.

(56) References Cited

OTHER PUBLICATIONS

Pal, et al., "Semi-Supervised Learning via Deep Label Propagation." Abstract, ACM, ISBN 978-1-4503-2138-9, 2016.

* cited by examiner

SEMI-SUPERVISED LEARNING VIA DEEP LABEL PROPAGATION

TECHNICAL FIELD

This disclosure generally relates to classification using machine learning.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

While the social-networking system may know a variety of information about its users, the knowledge base is not uniform across users. In other words, certain types of information may be known for some users but not for others. For example, the social-networking system may store information about a user's employer, hobby, likes and dislikes, and any other type of personal information. The system may know the employers and hobbies of certain users, but for other users the system may have incomplete knowledge of their employers and hobbies (i.e., the system may know at most the employer or hobby, but not both).

SUMMARY OF PARTICULAR EMBODIMENTS

Deep Label Propagation (DLP) is a machine-learning algorithm that uses label propagation and deep neural network techniques. In particular embodiments, DLP can base predictions on network-based information and, if desired, feature-based information. For example, a network of users in a social-networking system may each have a set of known labels (e.g., interests, favorite animal) and a set of unknown labels (e.g., employer). An objective of DLP may be to predict the values for those unknown labels. The user's unknown labels may be predicted using information associated with other users who are connected to the user. For example, the fact that several friends of a user work for a particular employer may suggest that the user is likely an employee of that employer as well. In addition, DLP may also take into consideration known features about the user, such as demographic information and location, to make the prediction.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen-in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
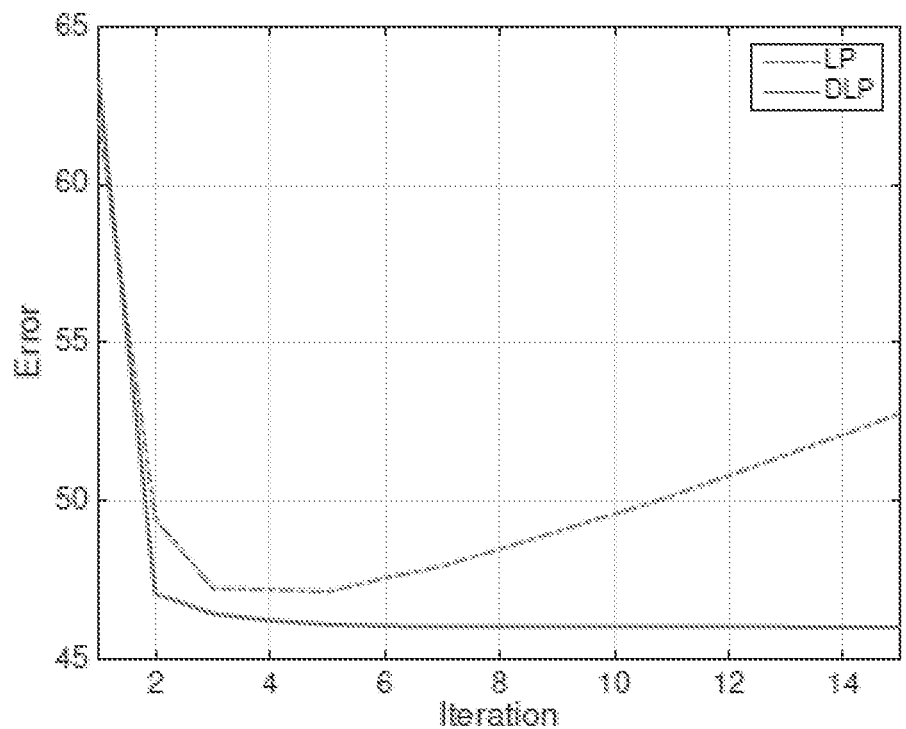
FIG. 1 illustrates an example experimental comparison between Label Propagation (LP) and Deep Label Propagation (DLP).

Classification problems may provide both object features and a network of links between objects. T h e Deep Label Propagation (DLP) technique described herein combines both the features and the network for collective classification, with the ability to appropriately weigh the two aspects based on how well they can predict the labels. DLP model is flexible enough to handle classical feature-only or network-only classification, and it easily extends to scenarios involving multiple networks. Experiments on real-world datasets show that DLP is competitive with the state of the art (out-performing them in most cases), for datasets with both features and network information, as well as for datasets where only feature information or only network information is available.

Classification based on features of objects, and classification based on a network of links between objects, have traditionally been perceived to be separate problems. DLP provides a classification technique that combines the two, and may be used to classify datasets exhibiting both characteristics (e.g., users of known demographics connected by co-purchasing patterns, such as in recommendation systems, or webpages with content-based features connected by hyperlinks, such as in web search). DLP may be used to classify nodes connected by a network, where some features are known for all nodes, and the target labels are known for a few nodes. Additionally, by combining node features and link information, particular embodiments of DLP leads to improvements in the classical classification tasks.

Features-only classifiers augment node features with latent node embeddings extracted from the network structure, and then perform classification based on the augmented features. However, such latent embeddings would only capture the large-scale structure of the network, while missing the fine-grained details that may be crucial for classification. For example, matrix factorization of the co-authorship network may pick out communities based on countries or large institutions or prolific authors, rather than those based on research interests. Also, it is unclear which embedding methods should be used: laplacian eigenmaps, non-negative matrix factorization, or other network-specific methods.

With network-only classifiers one can also convert node features into an affinity matrix between the nodes, that can be merged with the given network structure. A network-classifier such as Label Propagation can then be applied to this merged network. However, this adds a significant computational burden without always yielding commensurate benefits. For instance, building an affinity matrix based on demographic features of social media users (say, via RBF kernels) would (a) create a dense affinity matrix, and (b) introduce unintended long-range connections between otherwise unrelated users.

Another approach optimizes a combined loss function that is typically the sum of two parts, one encouraging correct predictions via features, and the second penalizing large differences between neighbors in the network. This can be viewed as learning based on features, with the network acting as a regularizer. However, when the features are not very informative, regularization may have limited impact. Moreover, a sum-of-parts loss function implicitly assumes conditional independence between the network structure and the labels given the features and model parameters. One approach for addressing these issues may be by tightly coupling the network context in the classifier training process. However this can hurt the performance if the network is uninformative for the classification task. Finally, such methods must overcome several practical issues: developing a dedicated solver, properly setting the regularization parameter, and difficulty in extending to cases with no features, or when multiple networks are available (e.g., follow-based and friendship-based), each needing its own regularization parameter.

Particular embodiments described herein may be based on two assumptions that underpin feature-based and network-based classifiers. First, it may be assumed the existence of global patterns connecting features to class labels that are applicable to all nodes in the network. Second, local continuity in a network may be assumed (e.g., objects linked in a network are often similar). Based on these assumptions, the following points may be postulated: (a) there exist latent features $X_i$ such that $X_i \approx X_j$ for objects i and j that are connected by the network; (b) combining these latents $X_i$ with any known features $Z_i$ gives the complete feature vector $\phi_i = (X_i, Z_i)$; and (c) the observed labels $Y_i$ are obtained by a non-linear stochastic function of the $\phi_i$. However, the presence of a large number of latent variables would appear to limit the usefulness of this approach. But as will be described further below, (d) under certain conditions, inference of the labels in the test set does not require inference of the latents.

Particular embodiments of Deep Label Propagation (DLP) described herein are based on the points above (i.e., a-d). In particular embodiments, the output of a network-based classifier (e.g., Label Propagation) may be used as extra features, alongside any known features, in a non-linear discriminative classifier. In particular embodiments, a deep neural network may be used as the classifier. Not only does DLP subsume standard network-based and feature-based classification as special cases, it also easily generalizes to multiple networks on the same set of objects. Unexpectedly, when only features (and no network) are given, DLP using the features and a network derived from these features outperforms simply using the features. The same holds when a network, and no features, is given. This phenomenon, described in detail below, extends the usefulness of DLP to the classical classification settings as well.

Deep neural networks have led to significant recent advances in image classification, object detection, conversational speech recognition, and recently in the game of GO. The underlying reason is their ability to learn rich multiple levels of feature representations and abstraction from the data.

In particular embodiments, a type of feedforward neural network called the multilayer perceptron learns a deterministic function $\Psi: \mathbb{R}^d \to \mathbb{R}^K$ from d-dimensional input ($Z \in \mathbb{R}^d$) to a K-dimensional output, through sequential application of non-linear transformations of the input:

$$h^k = \Gamma^k(W^k h^k + b^k) \forall k \in \{1, \ldots, M\}, \quad (1)$$

where $h^0 = Z$, M is the number of layers, with parameters $W^k$ (weight matrices) and $b^k$ (bias vectors). $\Gamma^k$ is a non-linear transfer function such as Tanh or ReLU. In particular embodiments, domain knowledge may also be incorporated in DNNs. For instance, for data with multi-dimensional spatial extent such as images and videos, convolutional neural networks may recursively apply convolutions on their input to capture local spatial context, followed by point-wise non-linearity.

In particular embodiments with respect to label propagation (LP), given an adjacency or affinity matrix W of a graph, and the labels Y for a subset $\mathcal{L}$ of nodes, the goal of label propagation is to infer labels of all the graph nodes. Label propagation may be applied in variety of tasks, such as multi class inference in social networks, authority estimation, and graph sharding. The LP model may estimate the labels for the set of unlabeled nodes by "propagating" labels from the labeled to the unlabeled nodes. This idea of propagation in graphs is also closely related to the random walk models.

In particular embodiments, the following formulation of LP poses a quadratic cost function for optimization, which is resilient to noisy labels in the training data:

$$C_\mu(F) = \sum_{i,j}^{\mathcal{L} \cup \mathcal{U}} W_{ij} \left\| \frac{F_i}{\sqrt{D_{ii}}} - \frac{F_j}{\sqrt{D_{jj}}} \right\|^2 + \mu \sum_i^{\mathcal{L} \cup \mathcal{U}} W_{ij} \|F_i - Y_i\|^2 \quad (2)$$

where $\mu \geq 0$, is a regularization parameter, $D_{ii} = \Sigma_j W_{ij}$ is the weighted degree of each node, F is a matrix where row $F_i \in \mathbb{R}^K$ denotes the label scores of $i^{th}$ node, and $Y_{ik} = 1$ if $i^{th}$ node belongs to class k, and is 0 otherwise (for unlabeled nodes $Y_i$ is set to 0). The cost function simultaneously rewards F for being close to the known labels, while also encouraging "local continuity" (similar nodes should have similar labels). The optimal $F^* = \arg\min_F \{C_\mu(F)\}$ may be:

$$F^* = (1-\alpha)(I - \alpha S)^{-1} Y, \quad (3)$$

where $$\alpha = \frac{1}{1+\mu},$$

and $S = D^{-1/2} W D^{-1/2}$ is the Graph Laplacian. However, the required matrix inversion is costly when the number of nodes is large, so an iterative approach may be preferred:

$$F^{t+1} = \alpha S F^{(t)} + (1-\alpha) Y \quad (4)$$

Since $\mu>0$, we have $0<\alpha<1$, so the iterative method is guaranteed to converge ($\lim_{t\to\infty} F^{(t)} \to F^*$).

Particular embodiments of statistical relational learning may have three parts: a classifier based on features (e.g. deep neural networks (DNN), support vector machine (SVM)), a relational classifier based on labels of graph neighbors (e.g. label propagation (LP), transductive support vector machine (TSVM)), and a collective inference procedure to spread labels through the graph. A weighted-vote relational neighbor classifier's performance is similar to LP. Other probabilistic relational models may represent more complex structures, but they may require large amounts of labeled data.

In particular embodiments, the graph Laplacian S may be directly incorporated in the DNN (Eq. 1), but this can hurt performance if the network is uninformative regarding the class labels. In particular embodiments, another approach to collective inference is via regularization, inferring a function $f_\theta$ with model parameters $\theta$ over the node features Z as follows:

$$\sum_{i,j}^{\mathcal{L}\cup\mathcal{U}} W_{ij}\|f_\theta(Z_i) - f_\theta(Z_j)\|^2 + \mu\sum_i^{\mathcal{L}} \text{loss}(f_\theta(Z_i), Y_i), \quad (5)$$

The first term is the network-based loss, as in LP (Eq. 2), and the second term is the loss of the node-specific classifier (e.g., loss can be cross-entropy for DNN). However, contrast these two equations: In Eq. 5, $f_\theta(Z_i)$ is embedding of the features Z while in LP, $f_\theta(Z_i)=F_i$, which depends only on i and not $Z_i$. The choice of functional form of $f_\theta(Z_i)$ dictates the different methods: logistic regression in Logistic Label Propagation, SVM with Hinge Loss in LapSVM, or a deep neural network in EmbedNN.

These approaches implicitly assume that the network is independent of the labels given the features $Z_i$ and the function $f_\theta$. Such an assumption may become unreasonable when there is a confounding hidden latent variable that affects both the network structure and the labels. In addition, these approaches rely on the features and use the network structure only as a regularizer, which can hinder performance, especially when the features are noisy.

In particular embodiments, Deep Learning Propagation effectively combines the network and the labels using a deep neural network. DLP does not assume conditional independence assumption like other methods that treat the network as a regularizer.

DLP model has been experimentally shown to outperform traditional label propagation (LP). In practice, the accuracy of traditional label propagation (LP) improves for the first few iterations, but then starts to worsen. In fact, the correct closed-form solution is often less accurate than the intermediate results, as shown in FIG. 1. This may be referred hereinafter to as the LP accuracy puzzle. FIG. 1 further shows that with DLP, the error rate remains low through successive iterations.

In particular embodiments, DLP may be applied to arbitrary partially-labeled network. In this case, the following may be defined: affinity matrix W, the labels $Y\mathcal{L}$ for the nodes in labeled set $\mathcal{L}$, and (optionally) the node features Z for all nodes. For the sake of simplicity, the labeled nodes $\mathcal{L}$ are numbered from 1 to $|\mathcal{L}|$ and the unlabeled nodes U from $|\mathcal{L}|+1$ to $|\mathcal{L}|+|U|$. The following may be inferred: the labels $Y_\mathcal{U}$ for the unlabeled nodes and the non-linear function $q(.)$, which takes as input the features Z and LPs output (F). In particular embodiments, an alternating optimization approach may be adopted: starting with a label scores F over all nodes obtained via LP, the algorithm may fix F and learn $q(.)$, and then vice versa (and repeat). In particular embodiments, the Deep Label Propagation algorithm may be defined as follows:

| Algorithm 1 Deep Label Propagation (DLP) |
|---|
| Require: Network W; Labeled set $\mathcal{L}$ with labels $Y_\mathcal{L}$;<br>    Unlabeled set $\mathcal{U}$; Parameters $\mu$ and $\beta$; node features<br>    Z (optional) |
| 1:     F = solveModifiedLP (W, $Y_\mathcal{L}$, 0, $\mu$, 0)     {vanilla LP} |
| 2:     repeat |
| 3:         Learn q: $(F_\mathcal{L}, Z_\mathcal{L}) \to Y_\mathcal{L}$     {train DNN} |
| 4:         $Y_\mathcal{U}$ = q $(F_\mathcal{U}, Z_\mathcal{U})$     {DNN predictions} |
| 5:         F = solveModifiedLP (W, $Y_\mathcal{L}$, $Y_\mathcal{U}$, $\mu$, $\beta$) |
| 6:     until convergence |
| 7:     return $F_\mathcal{U}$ |

| Algorithm 2 solveModifiedLP |
|---|
| Require: Network W; Known labels $Y_\mathcal{L}$; Predicted labels<br>    $Y_\mathcal{U}$ on unlabeled set; Parameters $\alpha$ and $\beta$ |
| 1:     $F^* = \arg\min_F C(F)$     {via e.g., Eq. 8} |
| 2:     $F^* = \dfrac{F^*}{F^* 1}$     {row normalization: $\Sigma_j F_{ij}^* = 1, \forall i$} |
| 3:     return $F^*$ |

Learning q given F. In particular embodiments, deep neural network (DNN) may be used for learning a non-linear function (e.g., Eq. 1). In each iteration, training may be based on the labeled set of nodes and the neural network may learn to predict the label $Y_i$ of a node i from an augmented feature list $(F_i, Z_i)$. The DNN may choose a q that minimizes a loss function (typically, the cross-entropy) between the ground-truth $Y\mathcal{L}$ and predictions $q(F\mathcal{L}, Z\mathcal{L})$.

Learning F given q. In particular embodiments, F may be learned by applying $q(.)$ to the unlabeled nodes (obtaining $Y_\mathcal{U}$). However, in the subsequent LP step, both $Y\mathcal{L}$ and $Y_\mathcal{U}$ would be weighted equally. Since only a small fraction of nodes are typically labeled ($|\mathcal{L}| \ll |U|$), any errors in $q(.)$ could swamp the ground truth information from the labeled nodes. To circumvent this problem, in particular embodiments a modified LP step that optimize the following cost function may be used:

$$C(F) = Tr\{F^T(I-S)F\} + \mu\cdot\text{Pen}(F), \quad (6)$$
$$\text{Pen}(F) = \|F_\mathcal{L} - Y_\mathcal{L}\|_F^2 + \beta\|F_\mathcal{U} - Y_\mathcal{U}\|_F^2 + (1-\beta)\|F_\mathcal{U}\|_F^2$$

where $\|\cdot\|_F$ is Frobenius norm of a matrix, $\mu$ is the relative penalty parameter as in LP (e.g., Eq. 2), S is the graph Laplacian, $F\mathcal{L}$ ($F_\mathcal{U}$) are restricted to the subset of labeled (unlabeled) nodes, and $Y_\mathcal{U}$ is set via $q(.)$. The parameter $\beta$ ($0\leq\beta\leq1$) represents the relative confidence in labels inferred via $q(.)$ to the ground truth labels. When $\beta=0$, this formulation would be Label Propagation (e.g., Eq. 2).

In particular embodiments, the optimal $F^*$ that minimizes Eq. 6 is:

$$F^* = (1-\alpha)(I - \alpha S)^{-1} Y', \quad (7)$$

-continued where $Y' = \begin{bmatrix} Y_L \\ \beta Y_u \end{bmatrix}$ and $\alpha = 1/(1+\mu)$ The similarity of LP (e.g., Eq. 3) with the modified LP solution (Eq. 7) suggests a corresponding iterative rule:

$$F^{(t+1)} = \alpha S F^{(t)} + (1+\alpha) Y' \quad (8)$$

This may be useful when the matrix inversion in Eq. 7 is infeasible. Finally, F may be normalized such that each $F_i$ sums to 1. This ensures that the label distribution of all nodes is on the same scale for training an effective DNN classifier (q).

In particular embodiments, DLP may have two practical advantages over competing methods. First, by using both the results of LP and the features Z as inputs to the DNN, it can learn to combine them optimally based on their predictive power. Indeed, DLP is able to discard F or Z if either is uninformative. This differentiates it from alternative techniques that learn q(.) strictly from Z, but in a manner that satisfies the LP constraints. Second, DLP has an easy implementation, with a slightly modified LP algorithm working with any off-the-shelf DNN trainer. No dedicated solvers need to be written from scratch.

As discussed above, particular embodiments of DLP uses a non-linear link function to combine information from the network structure, with information from node features. DLP, however, may also be used to handle machine learning tasks with only features, or with only the network.

In particular embodiments, DLP may handle tasks with missing network as follows. Given objects represented by features Z, the system may generate an affinity matrix W required by DLP via function kernels, such as the radial basis. For a large dataset, it may be convenient to represent only the affinity of each point with the top k most similar points; this makes W sparse and speeds up matrix operations. Such a network can help DLP improve upon standard feature-based algorithms, even though the network is a function of these features. This is because the Label Propagation aspect of DLP, by aggregating labels of similar objects, provides information about whether a particular test object is closer to the decision boundary or not. The q(.) function can then use the test object's features differently based upon this information. For instance, when most neighbors of a test object have the same label (i.e., far from the boundary), DLP may simply predict this label, while it may learn more on the test object's features when its neighbors disagree about the label (close to the boundary).

In particular embodiments, DLP may be used to handle tasks with missing features. Features (or "embeddings") may be learned from a network W, such that points that are well connected in W tend to have similar features (e.g., laplacian eigenmap, probabilistic matrix factorization, non-negative matrix factorization). In particular embodiments, laplacian eigenmaps (LE) may be used, where the top k eigenvectors of the graph Laplacian S yields a k-dimensional feature vector for each node. The features Z=LE(W) may then be used along-side W by DLP. The reason this may improve upon the accuracy of vanilla LP lies in the different assumptions made by the LP and the embedding methods. LP exploits "local continuity" in the network: nodes connected by an edge tend to be similar. Eigenmaps, on the other hand, correspond to "global" connection patterns among nodes. By combining both, DLP may be more accurate than either.

Figure 2:
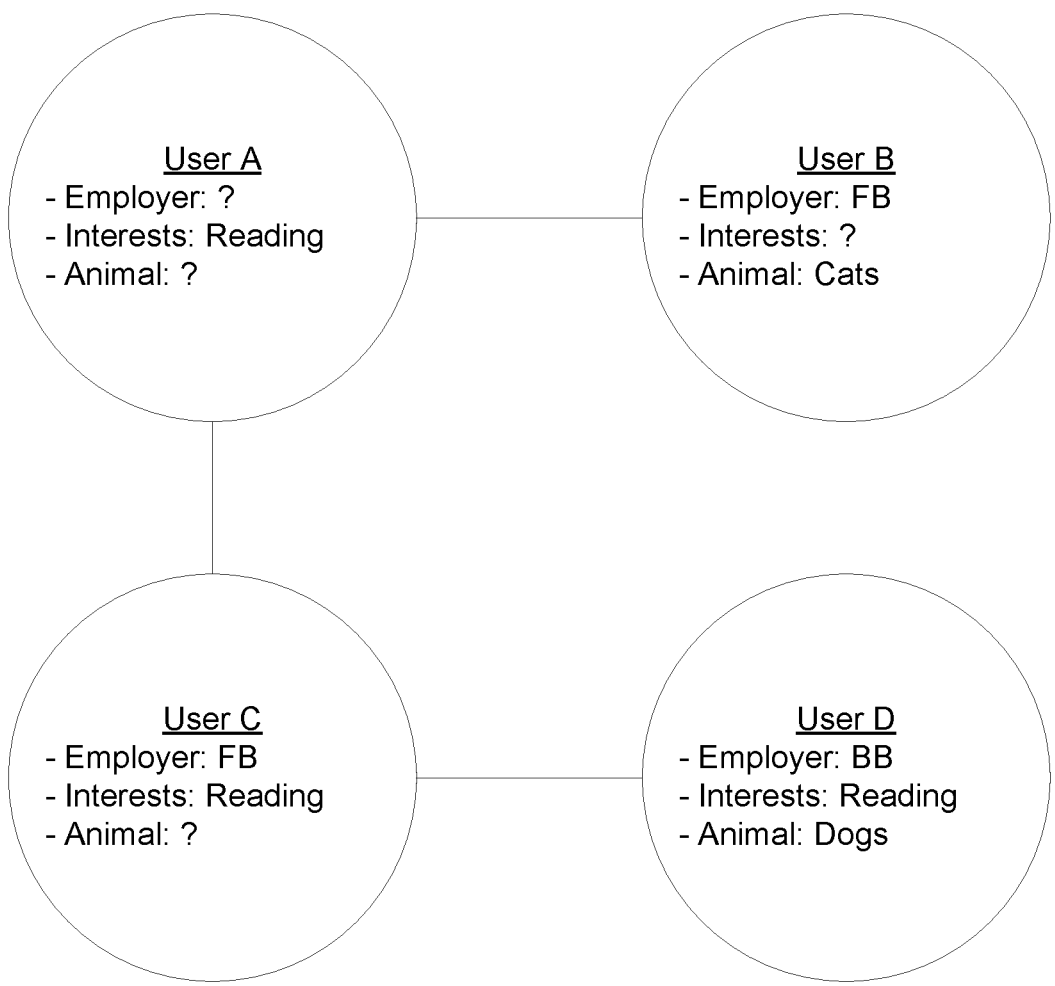
FIG. 2 illustrates an example graph data structure with partially labeled nodes.

In particular embodiments, DLP may be used in the context of a social-networking system to predict unknown features of users. In particular embodiments, DLP may be applied to a network of nodes (e.g., nodes in a social graph), each having a set of known labels and a set of unknown labels. FIG. 2 illustrates a simple social graph with four nodes that represent four users, User A, User B, User C, and User D. The edges in the network indicate that User A is directly connected to User B and User C, and indirectly connected to User D through User C. Each user may have labels different types, such as labels indicating the user's employer, interests, and favorite animal. The known labels may, for example, be entered by the user as part of his/her profile data. In this example, User A has one known label (i.e., he is interested in reading) and two unknown labels (i.e., his employer and favorite animal are unknown). The other users may similarly have known labels and/or unknown labels. DLP may be used to predict the unknown labels for each node (e.g., predict User A's employer and favorite animal).

In particular embodiments, DLP may begin with label propagation (hereinafter referred to as the Initial LP Step). Any label propagation (LP) technique may be used to propagate known labels (referred to as $Y_L$) of labeled nodes L across the network/graph. One result of LP is that each node in the network may have a label distribution. For example, in the simple network shown in FIG. 2, since User A's employer is unknown, User A may be associated with the propagated employer information from the other nodes, so that the employer label distribution assigned to User A may include FB of User B, FB of User C, and BB of User D, e.g., {FB×2, BB×1}. Similarly, User A's interest label distribution may be, e.g., {Reading×2}, and its animal label distribution may be, e.g., {Cats×1, Dogs×1}. After LP, each node may be associated with a label distribution. The label distribution of labeled nodes may be denoted as $F_L$, and the label distribution of unlabeled nodes may be denoted as $F_u$. For example, with respect to the employer label type, User A is considered to be an unlabeled node with $F_U$={FB×2, BB×1}. As another example, since User B's employer is known (i.e., FB), User B is considered to be a labeled node with $F_L$={FB×1, BB×1}. In particular embodiments, whiles user labels are propagated, features are not. However, features may nevertheless be used as features of the machine-learning model, as discussed further below.

In particular embodiments, the LP algorithm may impose certain constraints on how labels are propagated. For example, the distance between nodes may affect the label distribution assigned to the nodes. For instance, the LP algorithm may be configured to maximize the similarity (or minimize the difference) between label distributions assigned to neighboring nodes.

In particular embodiments, after the Initial LP step, the label distributions may be used to train a label classifier model, q, which outputs label predictions for a node given the label distribution and features (optional) associated with the node (hereinafter referred to as the Training Step). In particular embodiments, the training data may be a set of labeled nodes L with known labels $Y_L$, label distribution $F_L$, and features $Z_L$ (optional). The known labels $Y_L$ may be the target class or dependent variable used in the training. The predictors or independent variables may be the label distribution $F_L$ and features $Z_L$ (optional). The training may be represented by: q: $(F_L, Z_L) \rightarrow Y_L$.

In particular embodiments, the trained model q may then be used to predict the unknown labels $Y_U$ of a set of unlabeled nodes U (hereinafter referred to as the Labeling Step). The trained model q may take as input the label distributions $F_U$ and features $Z_U$ (optional) of the unlabeled nodes U, and output the predicted labels $Y_U$. This may be represented by: $q(F_U, Z_U)=Y_U$. After this step, each node may have a set of previously known labels $Y_L$ and a set of predicted labels $Y_U$ (which were originally unknown). In particular embodiments, known labels may remain unchanged throughout the DLP process.

In particular embodiments, LP may then be performed again (hereinafter referred to as the Subsequent LP Step), but this time the predicted labels $Y_U$ may also be propagated in addition to the known labels $Y_L$. This may result in a revised set of label distribution for each node (i.e., $F_L$ and $F_U$ may be updated).

In particular embodiments, after the label distribution has been updated, it may again be used to retrain the label classifier model q, which may again be used to predict the unknown labels $Y_U$. Since the underlying predictors have been updated (i.e., $F_L$ has been updated after the Subsequent LP Step), the model q would consequently be updated when it is retrained in another iteration of the Training Step. Then at the subsequent Labeling Step, the retrained model q may be applied to the updated label distributions $F_U$ of the unlabeled nodes U to predict labels $Y_U$. If additional iterations are desired, the Subsequent LP Step may again be performed to propagate the labels and the Training Step and Labeling Step may be repeated. The iterative process may terminate upon satisfaction of certain convergence conditions. For example, the convergence condition may be a predetermined number of iterations or upon detection that a benchmark metric no-longer changes significantly.

Figure 3:
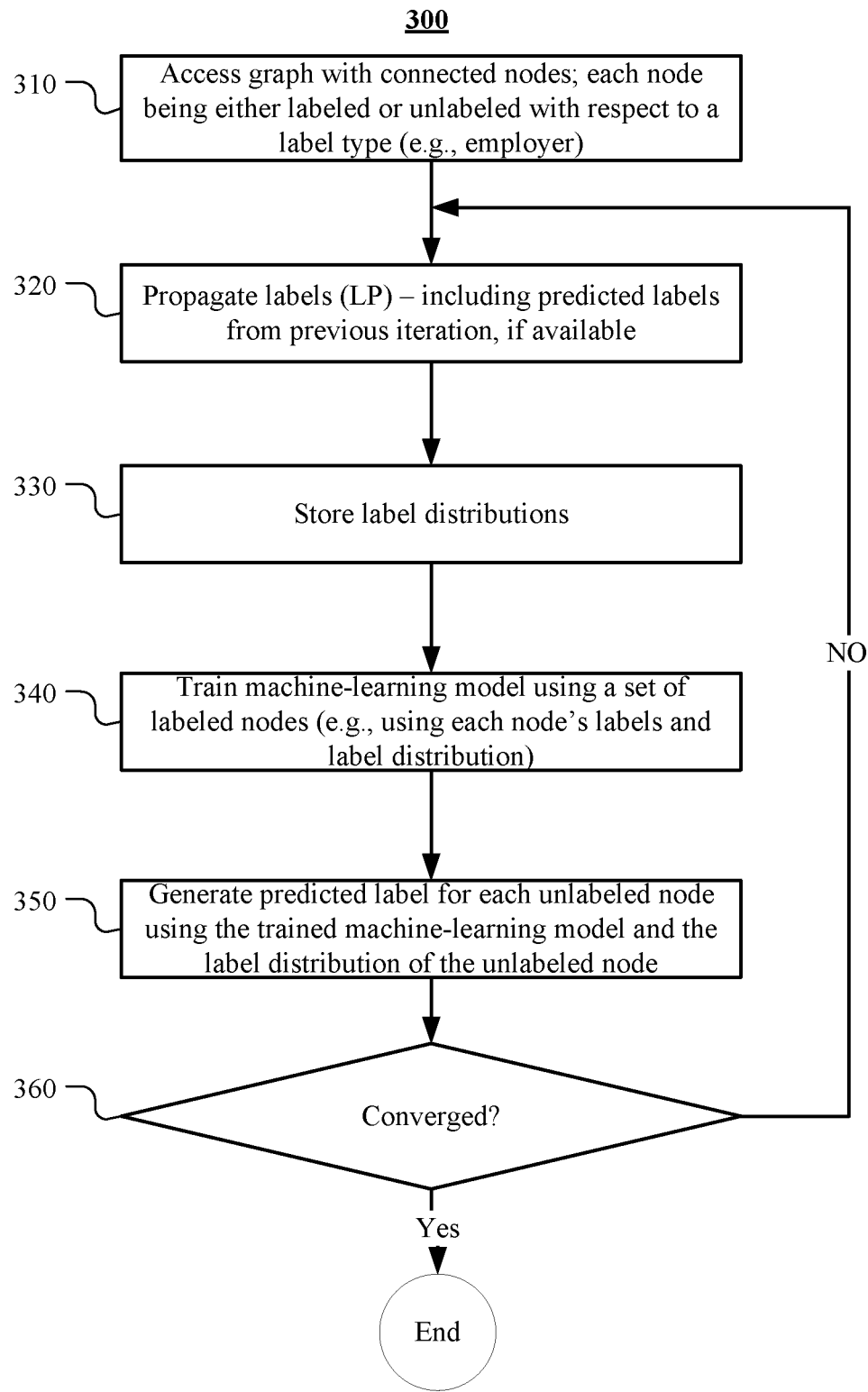
FIG. 3 illustrates an example method of generating a machine-learning model using DLP.

FIG. 3 illustrates an example method 300 for generating a machine-learning model using DLP. The method may begin at step 310, where a computer system may access a graph data structure that includes a plurality of nodes and connections between the nodes. Each of the nodes may be associated with one of a plurality of users of an online social network. Furthermore, each of the connections between two of the nodes may represent a relationship between the associated users and establish a single degree of separation between those users. Each of the nodes may be either labeled or unlabeled with respect to a label type. At step 320, for each of the labeled nodes, the system may propagate a label of the label type of that labeled node to one or more other nodes in the graph data structure through one or more connections connecting the labeled node and the one or more other nodes. In particular embodiments, in subsequent iterations the predicted labels of unlabeled nodes may similarly be propagated. At step 330, for each of the nodes, the system may store a first label distribution information associated with the label type based on the propagated labels reaching the node. In particular embodiments, in subsequent iterations the label distribution information may also include propagated predicted labels. At step 340, a machine-learning model may be trained to predict a label for a node based on the first label distribution information of the node. The machine-learning model may be trained using the labels and the first label distribution information of a set of the labeled nodes. At step 350, a predicted label may be generated for each of the unlabeled nodes using the trained machine-learning model and the first label distribution information associated with the unlabeled node. At step 360, a convergence condition may be checked. If the condition is not met, then the process may repeat with the generated predicted labels being propagated and used to train the machine-learning model. This process may repeat until the convergence condition is met.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating a machine-learning model using DLP including the particular steps of the method of FIG. 3, this disclosure contemplates any suitable method for generating a machine-learning model using DLP including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
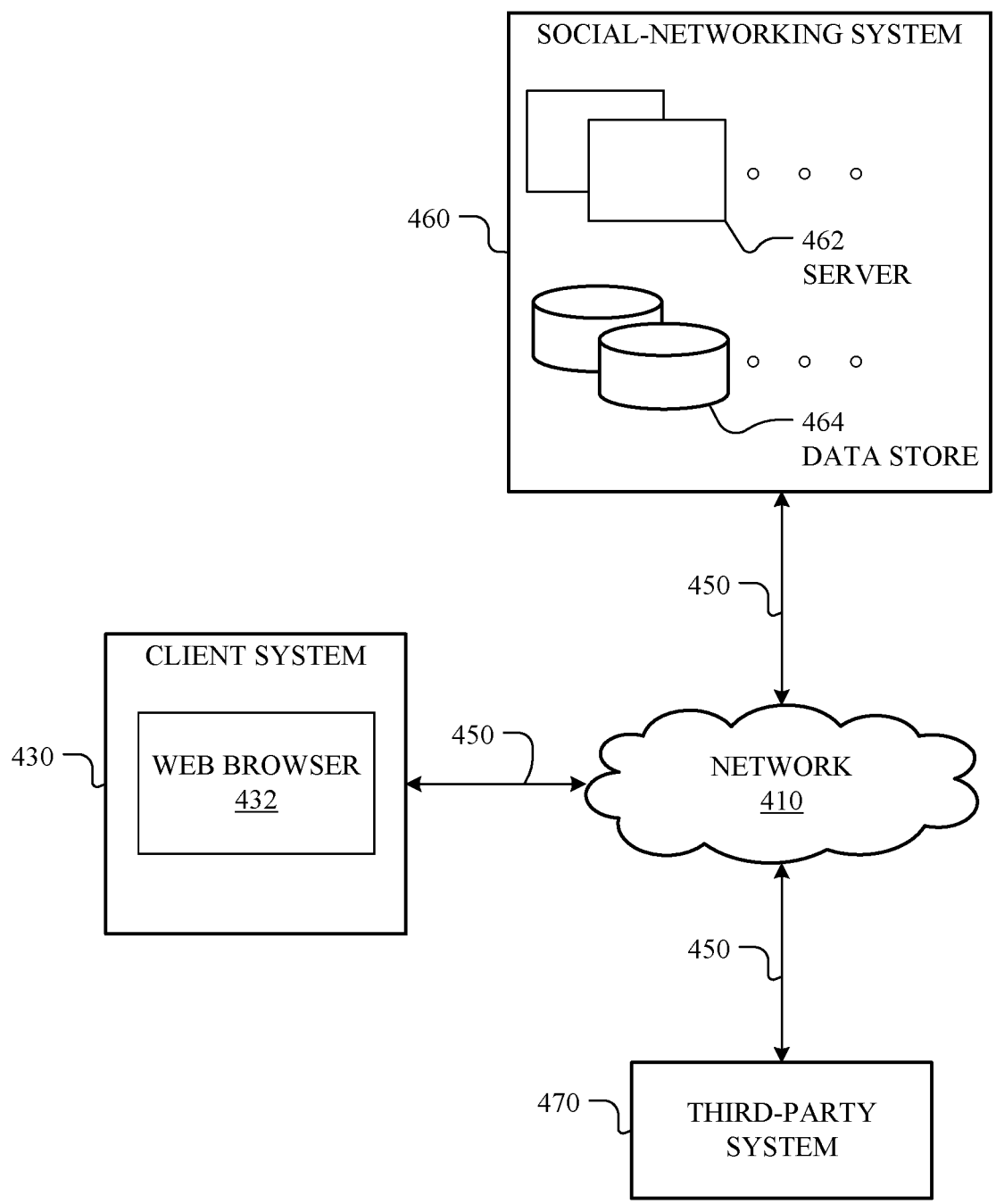
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
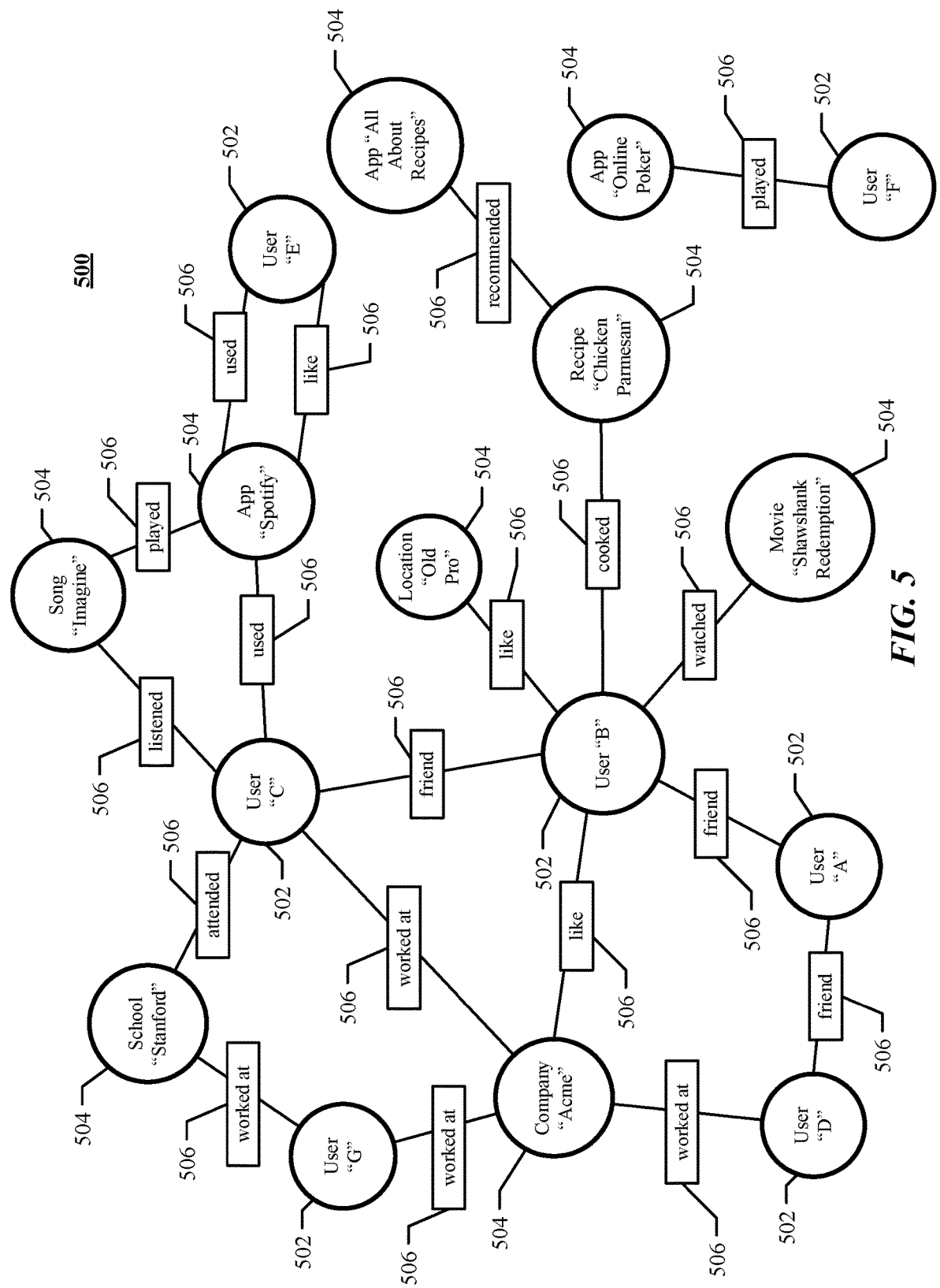
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any_suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user May be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 504 corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 470). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 470, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 460 may send a request to the data store 464 for the object. The request may identify the user associated with the request and may only be sent to the user (or a client system 430 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 6:
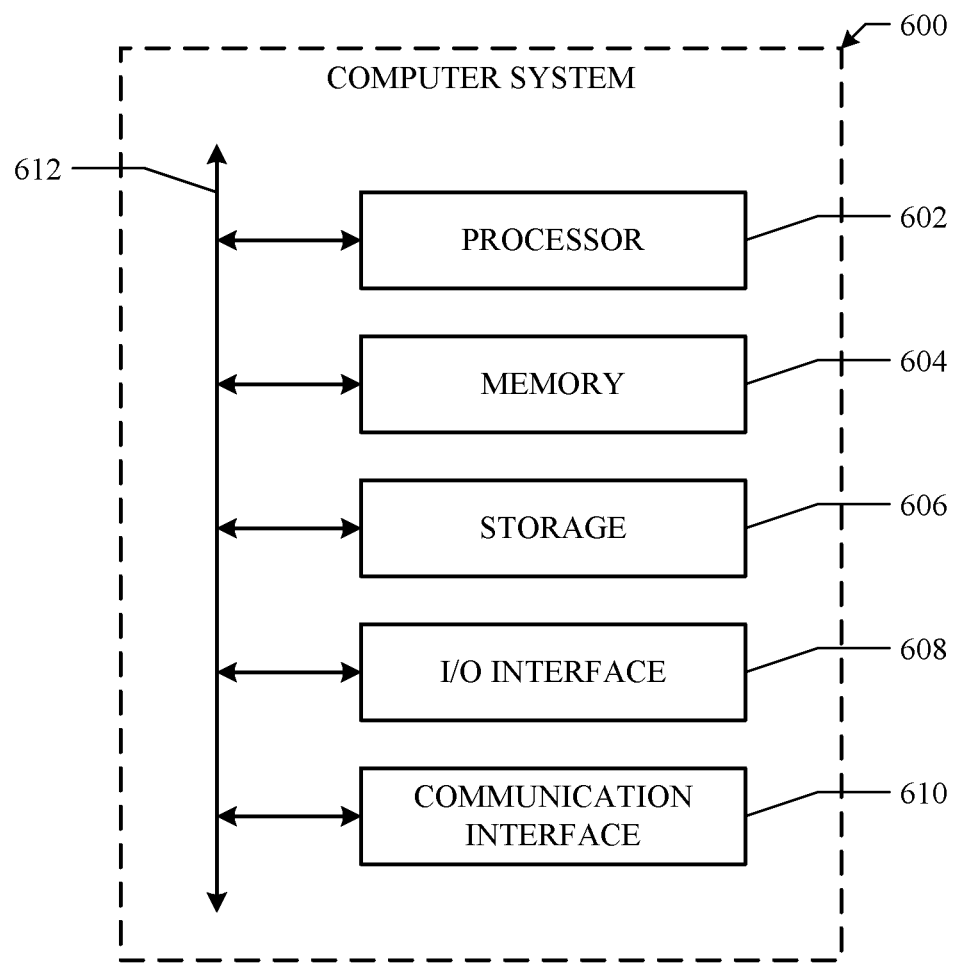
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In paiticular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, The claims:

1. A method comprising:

by a computing device, accessing a graph data structure comprising a plurality of nodes and connections between the nodes, each of the nodes being associated with one of a plurality of users of an online social network, each of the connections between two of the nodes representing a relationship between the associated users and establishing a single degree of separation between those users, each of the nodes being either labeled or unlabeled with respect to a label type;

by the computing device, for each of the labeled nodes, propagating a label of the label type of that labeled node to one or more other nodes in the graph data structure through one or more connections connecting the labeled node and the one or more other nodes;

by the computing device, for each of the nodes, storing a first label distribution information associated with the label type based on the propagated labels reaching the node;

by the computing device, training a machine-learning model using (1) the labels associated with a set of the labeled nodes, (2) the first label distribution information of the set of the labeled nodes, and (3) features associated with the labeled nodes, the machine-learning model being trained to predict a label for a node based on the first label distribution information and features of the node, wherein the features of the node are different from labels associated with the node and are known prior to the training and label propagation; and by the computing device, generating a predicted label for each of the unlabeled nodes using the trained machine-learning model by providing as inputs the first label distribution information associated with the unlabeled node and one or more features associated with the unlabeled node.

2. The method of claim 1, further comprising:

by the computing device, for each of the unlabeled nodes, propagating the predicted label of the unlabeled node to one or more other nodes in the graph data structure through one or more connections connecting the unlabeled node and the one or more other nodes; and by the computing device, for each of the nodes, storing a second label distribution information associated with the label type based on the propagated predicted labels reaching the node.

3. The method of claim 2, further comprising:

by the computing device, training a second machine-learning model using the labels, the first label distribution information, the features, and the second label distribution information of a second set of the labeled nodes, the second machine-learning model being trained to predict a label for a node based on the first label distribution information, the features, and the second label distribution information of the node; and by the computing device, generating a revised predicted label for each of the unlabeled nodes using the trained second machine-learning model, the first label distribution information associated with the unlabeled node, the one or more features associated with the unlabeled node, and the second label distribution information associated with the unlabeled node.

4. The method of claim 1, wherein the predicted label for each of the unlabeled nodes is iteratively revised;

wherein the machine-learning model is iteratively retrained;

wherein during each iteration of an iteration process:

the machine-learning model is retrained using the predicted labels generated in the previous iteration; and the predicted labels are revised using the machine-learning model retrained in the current iteration.

5. The method of claim 4, wherein the iteration process terminates upon satisfaction of a convergence condition.

6. The method of claim 4, wherein the iteration process terminates when a predetermined number of iterations complete.

7. The method of claim 1, wherein the features of the node comprise one or more of demographic or location information associated with a user represented by the node.

8. One or more computer-readable non-transitory storage media comprising software that is operable when executed to:

access a graph data structure comprising a plurality of nodes and connections between the nodes, each of the nodes being associated with one of a plurality of users of an online social network, each of the connections between two of the nodes representing a relationship between the associated users and establishing a single degree of separation between those users, each of the nodes being either labeled or unlabeled with respect to a label type;

for each of the labeled nodes, propagate a label of the label type of that labeled node to one or more other nodes in the graph data structure through one or more connections connecting the labeled node and the one or more other nodes;

for each of the nodes, store a first label distribution information associated with the label type based on the propagated labels reaching the node;

train a machine-learning model using (1) the labels associated with a set of the labeled nodes, (2) the first label distribution information of the set of the labeled nodes, and (3) features associated with the labeled nodes, the machine-learning model being trained to predict a label for a node based on the first label distribution information and features of the node, wherein the features of the node are different from labels associated with the node and are known prior to the training and label propagation; and generate a predicted label for each of the unlabeled nodes using the trained machine-learning model by providing as inputs the first label distribution information associated with the unlabeled node and one or more features associated with the unlabeled node.

9. The media of claim 8, wherein the software is further operable when executed to:

for each of the unlabeled nodes, propagate the predicted label of the unlabeled node to one or more other nodes in the graph data structure through one or more connections connecting the unlabeled node and the one or more other nodes; and for each of the nodes, store a second label distribution information associated with the label type based on the propagated predicted labels reaching the node.

10. The media of claim 9, wherein the software is further operable when executed to:

train a second machine-learning model using the labels, the first label distribution information, the features, and the second label distribution information of a second set of the labeled nodes, the second machine-learning model being trained to predict a label for a node based on the first label distribution information, the features, and the second label distribution information of the node; and generate a revised predicted label for each of the unlabeled nodes using the trained second machine-learning model, the first label distribution information associated with the unlabeled node, the one or more features associated with the unlabeled node, and the second label distribution information associated with the unlabeled node.

11. The media of claim 8,
wherein the predicted label for each of the unlabeled nodes is iteratively revised;
wherein the machine-learning model is iteratively retrained;
wherein during each iteration of an iteration process:
the machine-learning model is retrained using the predicted labels generated in the previous iteration; and
the predicted labels are revised using the machine-learning model retrained in the current iteration.

12. The media of claim 11, wherein the iteration process terminates upon satisfaction of a convergence condition.

13. The media of claim 11, wherein the iteration process terminates when a predetermined number of iterations complete.

14. The media of claim 8, wherein the features of the node comprise one or more of demographic or location information associated with a user represented by the node.

15. A system comprising:
one or more processors; and
one or more computer-readable non-transitory storage media coupled to one or more of the processors and comprising instructions operable when executed by one or more of the processors to cause the system to:
access a graph data structure comprising a plurality of nodes and connections between the nodes, each of the nodes being associated with one of a plurality of users of an online social network, each of the connections between two of the nodes representing a relationship between the associated users and establishing a single degree of separation between those users, each of the nodes being either labeled or unlabeled with respect to a label type;
for each of the labeled nodes, propagate a label of the label type of that labeled node to one or more other nodes in the graph data structure through one or more connections connecting the labeled node and the one or more other nodes;
for each of the nodes, store a first label distribution information associated with the label type based on the propagated labels reaching the node;
train a machine-learning model using (1) the labels associated with a set of the labeled nodes, (2) the first label distribution information of the set of the labeled nodes, and (3) features associated with the labeled nodes, the machine-learning model being trained to predict a label for a node based on the first label distribution information and features of the node, wherein the features of the node are different from labels associated with the node and are known prior to the training and label propagation; and generate a predicted label for each of the unlabeled nodes using the trained machine-learning model by providing as inputs the first label distribution information associated with the unlabeled node and one or more features associated with the unlabeled node.

16. The system of claim 15, wherein the instructions are further operable when executed by one or more of the processors to cause the system to:
for each of the unlabeled nodes, propagate the predicted label of the unlabeled node to one or more other nodes in the graph data structure through one or more connections connecting the unlabeled node and the one or more other nodes; and
for each of the nodes, store a second label distribution information associated with the label type based on the propagated predicted labels reaching the node.

17. The system of claim 16, wherein the instructions are further operable when executed by one or more of the processors to cause the system to:
train a second machine-learning model using the labels, the first label distribution information, the features, and the second label distribution information of a second set of the labeled nodes, the second machine-learning model being trained to predict a label for a node based on the first label distribution information, the features, and the second label distribution information of the node; and generate a revised predicted label for each of the unlabeled nodes using the trained second machine-learning model, the first label distribution information associated with the unlabeled node, the one or more features associated with the unlabeled node, and the second label distribution information associated with the unlabeled node.

18. The system of claim 15,
wherein the predicted label for each of the unlabeled nodes is iteratively revised;
wherein the machine-learning model is iteratively retrained;
wherein during each iteration of an iteration process:
the machine-learning model is retrained using the predicted labels generated in the previous iteration; and
the predicted labels are revised using the machine-learning model retrained in the current iteration.

19. The system of claim 18, wherein the iteration process terminates upon satisfaction of a convergence condition.

20. The system of claim 15, wherein the features of the node comprise one or more of demographic or location information associated with a user represented by the node.

* * * * *